(12) United States Patent
Jiang

(10) Patent No.: US 10,263,662 B2
(45) Date of Patent: Apr. 16, 2019

(54) CYCLIC-FREQUENCY SHIFT ORTHOGONAL FREQUENCY DIVISION MULTIPLEX DEVICE

(71) Applicant: Guizhou Dingtongxin Technologies Ltd., Guizhou Province (CN)

(72) Inventor: Jeng-Shiann Jiang, Zhubei (TW)

(73) Assignee: GUIZHOU DINGTONGXIN TECHNOLOGIES LTD., Guizhou Province (CN)

( * ) Notice: Subject to any disclaimer, the term of this patent is extended or adjusted under 35 U.S.C. 154(b) by 0 days.

(21) Appl. No.: 15/843,931

(22) Filed: Dec. 15, 2017

(65) Prior Publication Data
US 2018/0175906 A1 Jun. 21, 2018

(30) Foreign Application Priority Data

Dec. 16, 2016 (TW) .............................. 105141692 A
Apr. 7, 2017 (TW) .............................. 106111639 A

(51) Int. Cl.
| | | |
|---|---|---|
| *H04B 1/69* | (2011.01) | |
| *H04J 11/00* | (2006.01) | |
| *H04L 27/26* | (2006.01) | |
| *H04B 1/7136* | (2011.01) | |
| *H04B 1/7156* | (2011.01) | |

(52) U.S. Cl.
CPC ............ *H04B 1/7156* (2013.01); *H04B 1/69* (2013.01); *H04B 1/7136* (2013.01); *H04J 11/0063* (2013.01); *H04L 27/2634* (2013.01); *H04B 2001/71367* (2013.01); *H04L 27/2607* (2013.01); *H04L 27/2615* (2013.01); *H04L 27/2628* (2013.01); *H04L 27/2649* (2013.01)

(58) Field of Classification Search
CPC ............. H04L 27/2623; H04L 27/2082; H04L 2025/03426; H04L 2025/03802; H04L 25/0212; H04L 25/03343; H04L 27/2607; H04L 27/2613; H04L 27/2636; H04L 5/0053; H04L 5/0091; H04L 5/0096; H04L 5/1469; H04B 7/0671; H04J 11/003; H04J 13/004; H04J 13/0074; H04W 28/06; H04W 48/08; H04W 72/1226; H04W 99/00
See application file for complete search history.

(56) References Cited

U.S. PATENT DOCUMENTS

| | | | |
|---|---|---|---|
| 2008/0043812 A1* | 2/2008 | Moffatt | .................. H04B 1/707 375/133 |
| 2009/0059882 A1* | 3/2009 | Hwang | .................. H04L 5/0021 370/342 |
| 2010/0111209 A1 | 5/2010 | Frenger | |
| 2012/0039281 A1* | 2/2012 | Pajukoski | .............. H04J 11/003 370/329 |
| 2012/0147848 A1 | 6/2012 | Popovic | |

* cited by examiner

*Primary Examiner* — Ross Varndell
(74) *Attorney, Agent, or Firm* — Muncy, Geissler, Olds & Lowe, P.C.

(57) ABSTRACT

The invention discloses a cyclic-Frequency shift orthogonal frequency division multiplex spread spectrum device, comprising: at least one communication device for performing the conversion between a series of bits and a frequency domain symbol out of a plurality of frequency combination patterns; wherein different patterns correspond to different bit values; and the device forms a cyclic frequency shift value utilizing a frequency reordering, each of the cyclic frequency shift values corresponding to a frequency combination pattern.

11 Claims, 6 Drawing Sheets

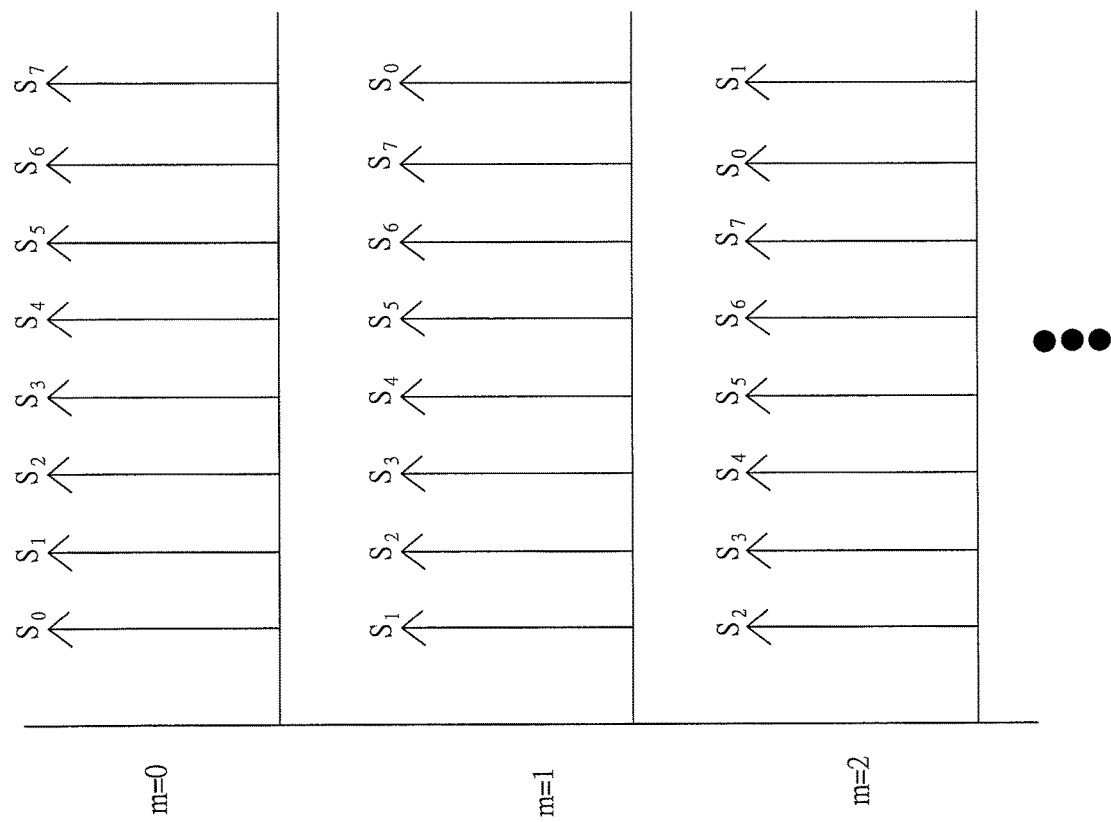

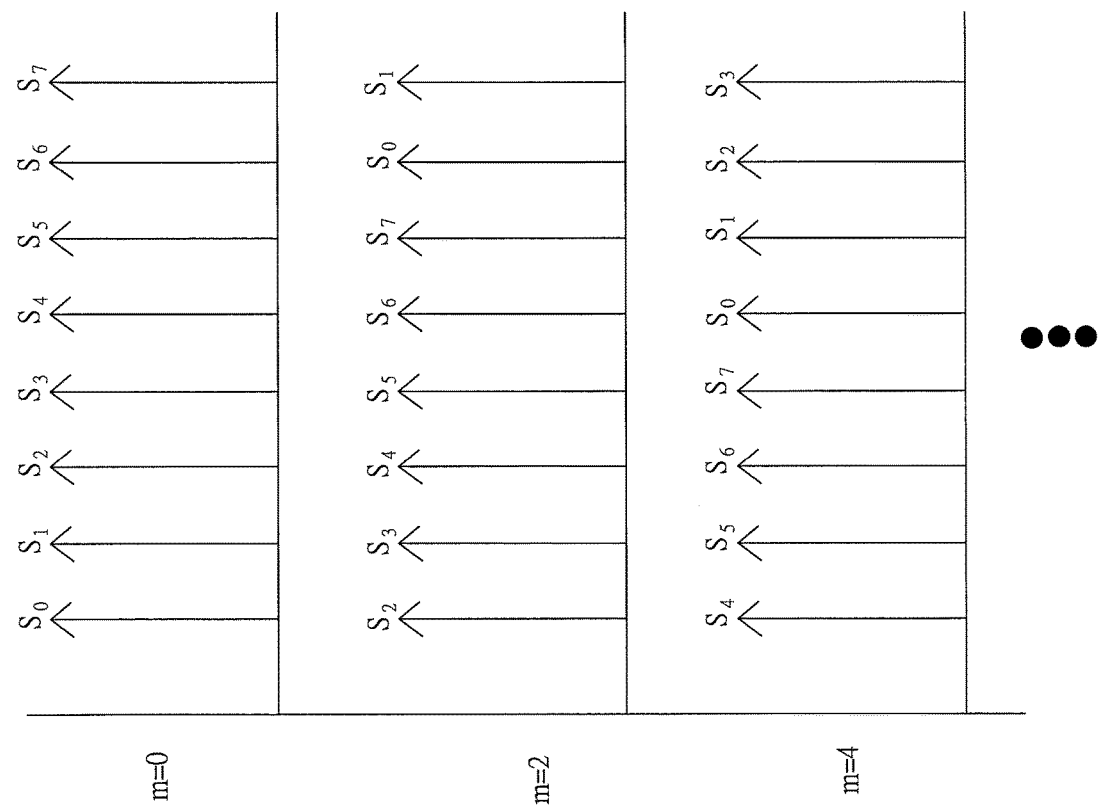

ated through the cyclic frequency shift value as

CYCLIC-FREQUENCY SHIFT ORTHOGONAL FREQUENCY DIVISION MULTIPLEX DEVICE

BACKGROUND OF THE INVENTION

This application claims priority of No. 105141692 filed in Taiwan R.O.C. on Dec. 16, 2016 and No. 106111639 filed in Taiwan R.O.C. on Apr. 7, 2017 under 35 USC 119, the entire contents of which are hereby incorporated by reference.

Field of the Invention

The invention relates to a spread spectrum device, and more particularly to a cyclic-frequency shift (referred to as CFS) orthogonal frequency division multiplex (referred to as OFDM) spread spectrum device.

Description of the Related Art

Spread-spectrum technology is a kind of communication technology that intentionally transmits messages with the broadband bandwidth that is several times higher than the minimum required message bandwidth, and the objective thereof is to achieve more stable transmission and resist the interference.

At present, the conventional spread spectrum technology includes the direct sequence spread spectrum (hereinafter referred to as DSSS), the frequency hopping spread spectrum (hereinafter referred to as FHSS) and the chirp spread spectrum (hereinafter referred to as CSS) technology. The DSSS spread spectrum technology is to modulate and transmit the original single bit of message using a long string of pseudo random sequence. The duration of the original single bit is equal to the duration of the pseudo random sequence (i.e., the chip time of the pseudo random sequence is very short), the broadband transmission is thus formed. The FHSS is to divide the available bandwidth into many sub-bands, with the sub-band selected in a pseudo random manner to perform the repeated transmission upon message transmission. In the CSS spread spectrum technology, each bit of message is transmitted using a chirp signal. Because the chirp signal itself is a broadband signal, the spread spectrum effect is thus obtained.

The drawbacks of the DSSS spread spectrum technology will be described in the following. The first drawback is that the ability against the multipath is poor because each pseudo random chip time is extremely short. The second drawback is that the higher power consumption is caused due to the high-speed transmission. The FHSS spread spectrum has the first drawback that the synchronization between the transmission end and the receiving end becomes more difficult, and the second drawback that the bandwidth usage is reduced because the synchronization needs to be performed upon each frequency hopping, so that the final transmission rate is slower than that of the DSSS spread spectrum method. The CSS spread spectrum has the first drawback that the ability against the multipath is poor, and the second drawback that each chirp signal only carries one bit, which results in slower transmission rate.

SUMMARY OF THE INVENTION

The invention provides a CFS-OFDM spread spectrum technology, which is capable of providing a stable transmission quality under the condition of the very low signal-to-noise ratio, and is applicable to various kinds of wired and wireless communication systems.

An embodiment of the invention provides a cyclic-frequency shift orthogonal frequency division multiplex spread spectrum device, comprising: at least one communication device for performing the conversion between a series of bits and a frequency domain symbol out of a plurality of frequency combination patterns; wherein different patterns correspond to different bit values; and the device forming a cyclic frequency shift value utilizing a frequency reordering, each of the cyclic frequency shift values corresponding to a frequency combination pattern.

BRIEF DESCRIPTION OF THE DRAWINGS

FIG. 1A is a schematic diagram of a bit value corresponding to a frequency combination pattern.

FIG. 1B is a schematic diagram of a bit value corresponding to a frequency combination pattern.

DETAILED DESCRIPTION OF THE INVENTION

Figure 1C:
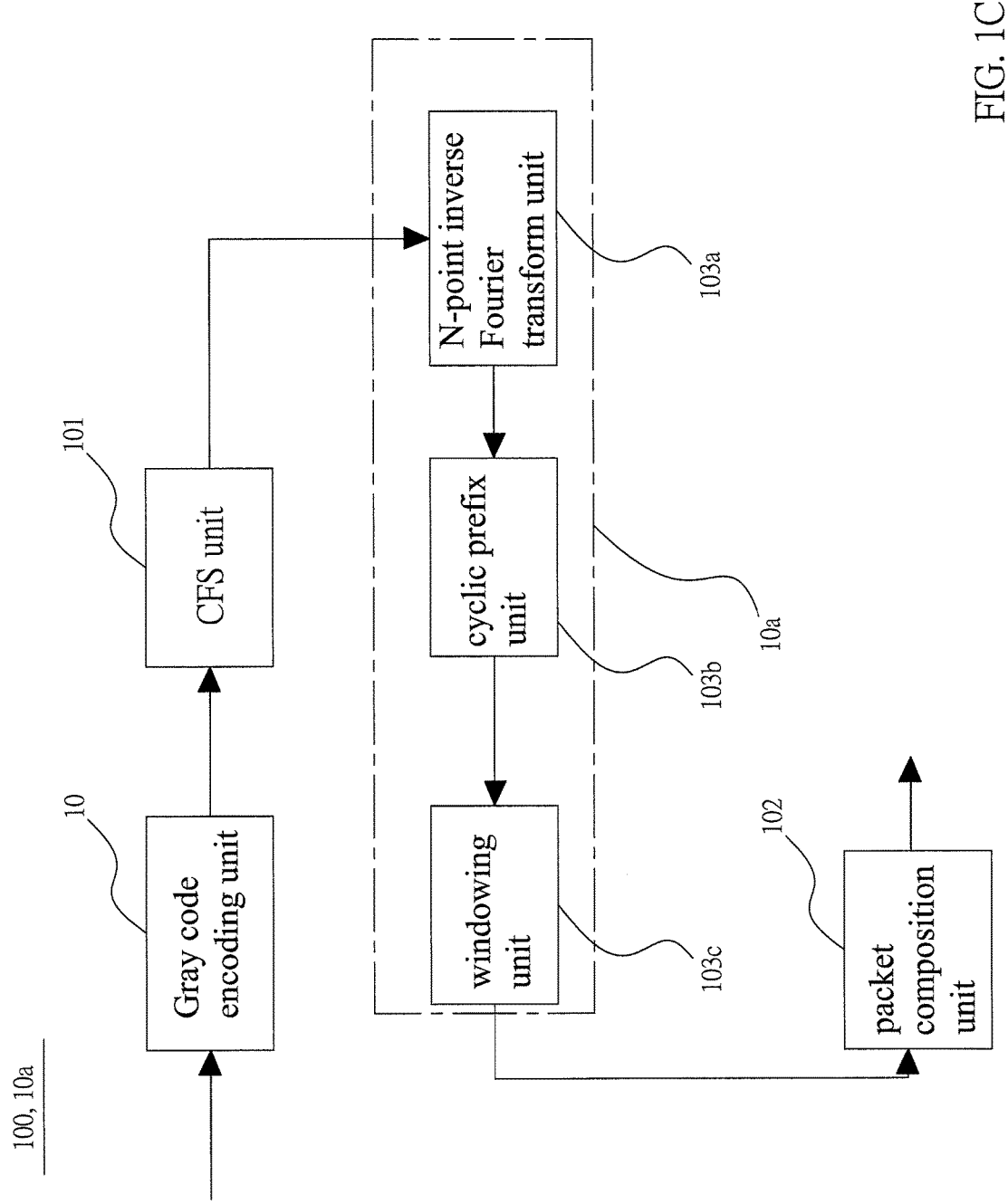
FIG. 1C is a schematic view showing an example of a transmitter of the invention.

An embodiment of the invention provides a cyclic-frequency shift orthogonal frequency division multiplex spread spectrum device, comprising: at least one communication device for performing the conversion between a series of bits and a frequency domain symbol out of a plurality of frequency combination patterns; wherein different patterns correspond to different bit values. In an embodiment, the frequencies arranged in sequence may be ordered as a first pattern, and the frequencies may be shifted to the left or right in a cyclic manner as other patterns. More details are as follows.

Please refer to FIG. 1A, FIG. 1A is a schematic diagram of a bit value corresponding to a frequency combination pattern. In the embodiment, different frequency combination patterns correspond to different bit values, and the bit values can be a binary code or a Gray code.

For example, when N=8, k=3 bits of information can be transmitted through the cyclic frequency shift value as shown in the following two tables; wherein m is the cyclic frequency shift value, 3 bits of information is $b_2b_1b_0$, Gray Code is $g_2g_1g_0$, the original subcarrier content is $S_0S_1S_2S_3S_4S_5S_6S_7$. When the cyclic frequency shift is 1, the order of the subcarriers becomes $S_1S_2S_3S_4S_5S_6S_7S_0$. When the cyclic frequency shift is 2, the order of the subcarriers becomes $S_2S_3S_4S_5S_6S_7S_0S_1$, and so on. The example in the following table are left cyclic frequency shifts, however, the cyclic frequency shift of the present invention is not limited to left or right cyclic frequency shift. The variable m denotes cyclic frequency shift value, S(k) denotes the frequency domain symbol, k denotes the $k^{th}$ subcarrier. In addition, if majority of subcarriers are cyclic shifts with only a few subcarriers not cyclic shifts, the scenario is still covered by the present invention.

| cyclic frequency shift value m | $b_2b_1b_0$ | $g_2g_1g_0$ | subcarrier content |
|---|---|---|---|
| 0 | 000 | 000 | $S_0S_1S_2S_3S_4S_5S_6S_7$ |
| 1 | 001 | 001 | $S_1S_2S_3S_4S_5S_6S_7S_0$ |

-continued

| cyclic frequency shift value m | $b_2b_1b_0$ | $g_2g_1g_0$ | subcarrier content |
|---|---|---|---|
| 2 | 011 | 010 | $S_2S_3S_4S_5S_6S_7S_0S_1$ |
| 3 | 010 | 011 | $S_3S_4S_5S_6S_7S_0S_1S_2$ |
| 4 | 110 | 100 | $S_4S_5S_6S_7S_0S_1S_2S_3$ |
| 5 | 111 | 101 | $S_5S_6S_7S_0S_1S_2S_3S_4$ |
| 6 | 101 | 110 | $S_6S_7S_0S_1S_2S_3S_4S_5$ |
| 7 | 100 | 111 | $S_7S_0S_1S_2S_3S_4S_5S_6$ |

Please refer to FIG. 1B, if only the even-numbered cyclic frequency shift is performed as shown in the following table, the data rate is reduced since only two bits can be transmitted. However, an odd-numbered cyclic frequency shift can be excluded in demodulation, thus the stability can be improved accordingly.

| cyclic frequency shift value m | $b_1b_0$ | $g_1g_0$ | subcarrier content |
|---|---|---|---|
| 0 | 00 | 00 | $S_0S_1S_2S_3S_4S_5S_6S_7$ |
| 2 | 01 | 01 | $S_2S_3S_4S_5S_6S_7S_0S_1$ |
| 4 | 11 | 10 | $S_4S_5S_6S_7S_0S_1S_2S_3$ |
| 6 | 10 | 11 | $S_6S_7S_0S_1S_2S_3S_4S_5$ |

In other words, in the present embodiment, the present invention utilizes frequency reordering to form the cyclic frequency shift, and each cyclic frequency shift value corresponds to a combined pattern. It should be understood that the order of frequency in order is only an example, and those having ordinary knowledge in the art may change or create various combinations according to the description of the present invention.

Please refer to FIG. 1C. FIG. 1C is a schematic view showing a transmitter of a cyclic-frequency shift orthogonal frequency division multiplex spread spectrum device according to an embodiment of the invention.

The embodiment of the invention provides a cyclic-frequency shift orthogonal frequency division multiplex spread spectrum device 100 including: a transmitter 10a, which includes a CFS unit 101, receives and converts a series of bits into a frequency domain symbol composed of N subcarriers, wherein the frequency domain symbol is a function of a cyclic-frequency shift value and a Gray code encoding unit 10 is used to minimize a bit error rate when a symbol demodulation error occurs; an OFDM transmission unit 103, which receives and converts the frequency domain symbol into a time domain symbol.

Substituting k=0 to 7, m=0 to 7 and N=8 into the mathematical equation S (mod (k+m, N)), and we will get the following table:

| | k | | | | | | | |
|---|---|---|---|---|---|---|---|---|
| m | 0 | 1 | 2 | 3 | 4 | 5 | 6 | 7 |
| 0 | $S_0$ | $S_1$ | $S_2$ | $S_3$ | $S_4$ | $S_5$ | $S_6$ | $S_7$ |
| 1 | $S_1$ | $S_2$ | $S_3$ | $S_4$ | $S_5$ | $S_6$ | $S_7$ | $S_0$ |
| 2 | $S_2$ | $S_3$ | $S_4$ | $S_5$ | $S_6$ | $S_7$ | $S_0$ | $S_1$ |
| 3 | $S_3$ | $S_4$ | $S_5$ | $S_6$ | $S_7$ | $S_0$ | $S_1$ | $S_2$ |
| 4 | $S_4$ | $S_5$ | $S_6$ | $S_7$ | $S_0$ | $S_1$ | $S_2$ | $S_3$ |
| 5 | $S_5$ | $S_6$ | $S_7$ | $S_0$ | $S_1$ | $S_2$ | $S_3$ | $S_4$ |
| 6 | $S_6$ | $S_7$ | $S_0$ | $S_1$ | $S_2$ | $S_3$ | $S_4$ | $S_5$ |
| 7 | $S_7$ | $S_0$ | $S_1$ | $S_2$ | $S_3$ | $S_4$ | $S_5$ | $S_6$ |

Please note that in the CFS-OFDM spread spectrum technology, the information is transmitted through the cyclic-frequency shift value of the broadband OFDM signal. Please refer to the above table and mathematical equation, the signal of CFS-OFDM spread spectrum technology satisfies Equation (1):

$$s_m(n) = \sum_{k=0}^{N-1} S(\mathrm{mod}(k+m, N))e^{j2\pi kn/N}, m = 0 \sim N-1, \quad (1)$$

where N denotes the number of all the subcarriers of the OFDM transmission unit, S(k) denotes the frequency domain symbol, k denotes the $k^{th}$ subcarrier, s(n) denotes a time domain signal, n denotes a $n^{th}$ time point, m denotes the cyclic-frequency shift value in a unit of subcarriers, mod(., N) denotes taking a remainder of N, and N may be a power of two.

Because the possible values of the cyclic-frequency shift m may range from 0 to N−1, one CFS-OFDM symbol can transmit at most K=$\log_2$(N) bits of messages.

Theoretically, any aperiodic signal of S(k) may function as the CFS-OFDM, but properly selecting the S(k) can obtain better transmission quality. The so-called proper selection includes selecting the one having good auto-correlation property and low peak to average power ratio (hereinafter referred to as PAPR). For example, the two advantages are possessed when the selected S(k) is as shown in Equation (2):

$$S(k) = \exp^{\pm j\pi \frac{k^2}{N}}, k = 0 \sim N-1. \quad (2)$$

In this embodiment, the PAPR of the real part or imaginary part on the time domain is about 3 dB, and the auto-correlation is much larger than 0 only when k=0, and is equal to 0 when k≠0. So, this is a very good choice for CFS-OFDM.

In an embodiment of the invention, the OFDM transmission unit 103 includes: an N-inverse Fourier transform unit 103a, which is coupled to the CFS unit 101, and converts an N-point frequency domain symbol into an N-point time domain symbol; a cyclic prefix (CP) unit 103b, which copies a partial of the symbol at a distal end of the N-point time domain symbol to a front end of the N-point time domain symbol to generate the time domain symbol; and a windowing unit 103c, which is coupled to the cyclic prefix unit 103b and reduces interference of the time domain packet on adjacent bands. Finally, the packet composition unit 102 combines a preamble, a header, and a payload to generate a time domain packet.

The message length is K bits, where K may be smaller than or equal to $\log_2$(N). When K is equal to $\log_2$(N), it represents that all the cyclic-frequency shifts, including 0 to N−1 are used. On the contrary, when K is smaller than $\log_2$(N), it represents that only a portion of the cyclic-frequency shifts (e.g., only the even-numbered cyclic-frequency shifts) are used. This can prevent the misdetection of the adjacent cyclic-frequency shifts from occurring, and is a method which obtains the higher stability by reducing the data rate. In addition, one reason of using only a portion of the cyclic-frequency shifts is due to the regulatory restriction of the frequency spectrum, which prohibits some bands from being used, so that only M≤N subcarriers are used to generate the CFS-OFDM signal. Under the circumstances, N in Equations (1) and (2) should be replaced with M. After the value of K is determined, the K-bit message is firstly converted through Gray code, wherein the Gray code can ensure that there is only one different bit between the K bits represented by the adjacent cyclic-frequency shifts. Because the error occurs most frequently when the cyclic-frequency shift is equal to ±1, the bit error rate can be minimized through the Gray code. The Gray-code-converted decimal value is the value of the cyclic-frequency shift. Then, the signal is transformed to the time domain by way of inverse Fourier transform according to the cyclic-frequency shift value and Equation (1). Next, the cyclic prefix (CP) is added to enhance the immunity against multipath. Finally, windowing is added to reduce the interference on the adjacent bands.

Figure 2:
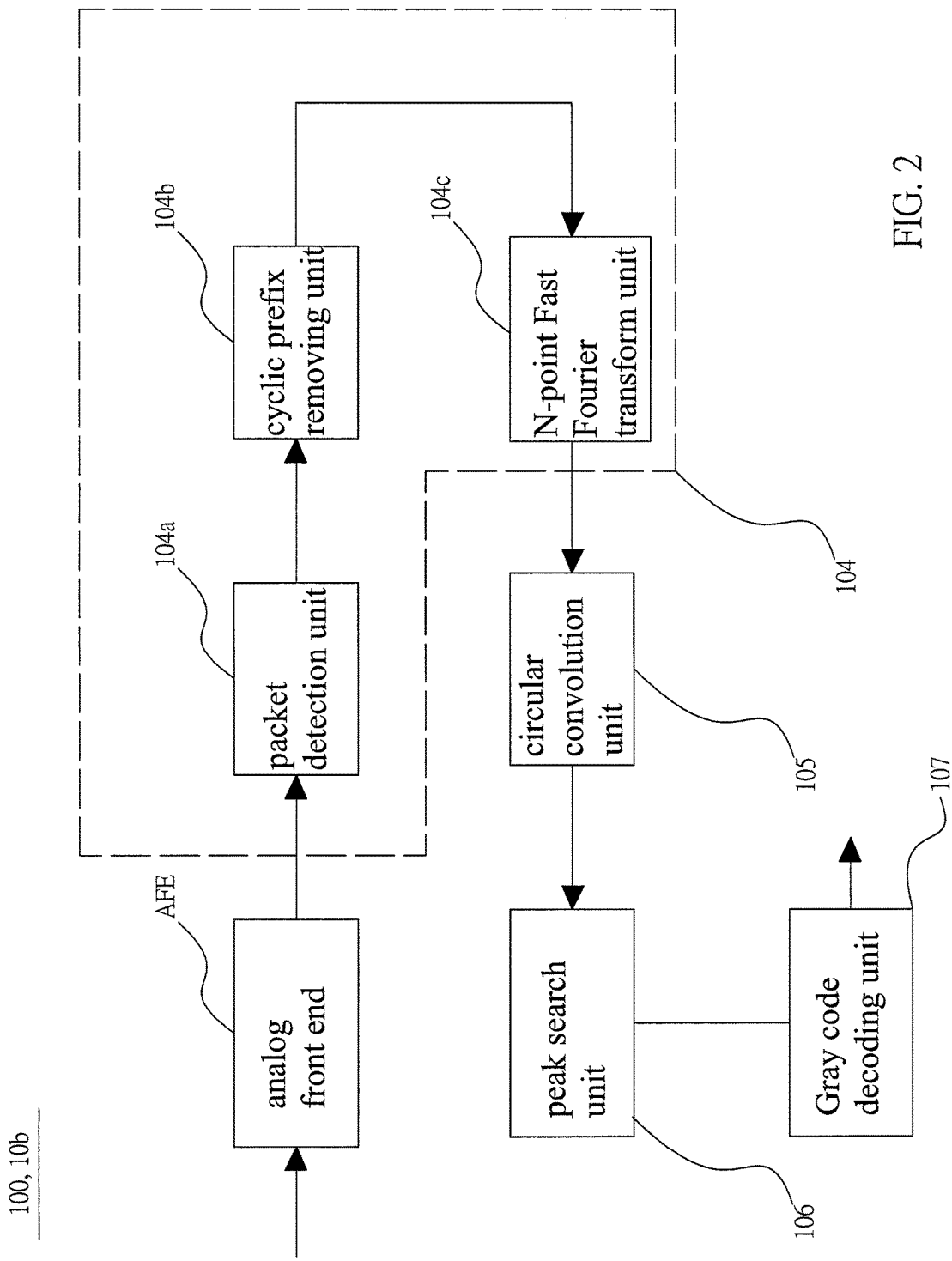
FIGS. 2 to 4 are schematic views showing receiving ends according to embodiments of the invention.

Please refer next to FIG. 2. FIG. 2 is a schematic view showing a receiving end according to the first embodiment of the invention. An analog front end (AFE) of the invention includes an analog filter, a signal gain amplifier, and an analog-to-digital conversion circuit.

A receiving end 10b includes an OFDM receiving unit 104, which receives and converts the time domain packet into the frequency domain symbols. In the first embodiment, the OFDM receiving unit 104 includes: a packet detection unit 104a, which detects the presence of time domain packet according to the frame preamble, adjusts the gain, and performs the estimation and compensation for the sample rate offset and frequency offset. A cyclic prefix removing unit 104b removes a cyclic prefix added to the time domain symbol to restore the N-point time domain symbol. An N-point Fast Fourier transform (N-FFT) unit 104c converts the N-point time domain symbol into the frequency domain symbol.

Next, a circular convolution unit 105 performs circular convolution on the frequency domain symbol with conj(S(−k)). A peak search unit 106 is coupled to the circular convolution unit 105 and determines the cyclic-frequency shift value corresponding to the peak of the circular convolution result. A Gray code decoding unit 107 uses the cyclic-frequency shift value to decode the K-bit message.

After the cyclic prefix removing unit 104b removes the cyclic prefix of CFS-OFDM, the N-point Fast Fourier transform (N-FFT) transforms the signal into the frequency domain. Heretofore, the procedures are the same as the ordinary method of receiving the OFDM signal. Thereafter, the circular convolution is performed on the received signal and conj(S(−k)) on the frequency domain, and the resulted peak corresponds to the correct cyclic-frequency shift value. This is the auto-correlation property of S(k) mentioned hereinbefore. That is, in noiseless condition the value is greater than 0 only when the cyclic-frequency shift is correct, and the value is equal to 0 for the other cyclic-frequency shifts. After the peak search unit 106 has found the correct cyclic-frequency shift, the Gray code decoding unit 108 can restore the original K-bit message.

Figure 3:
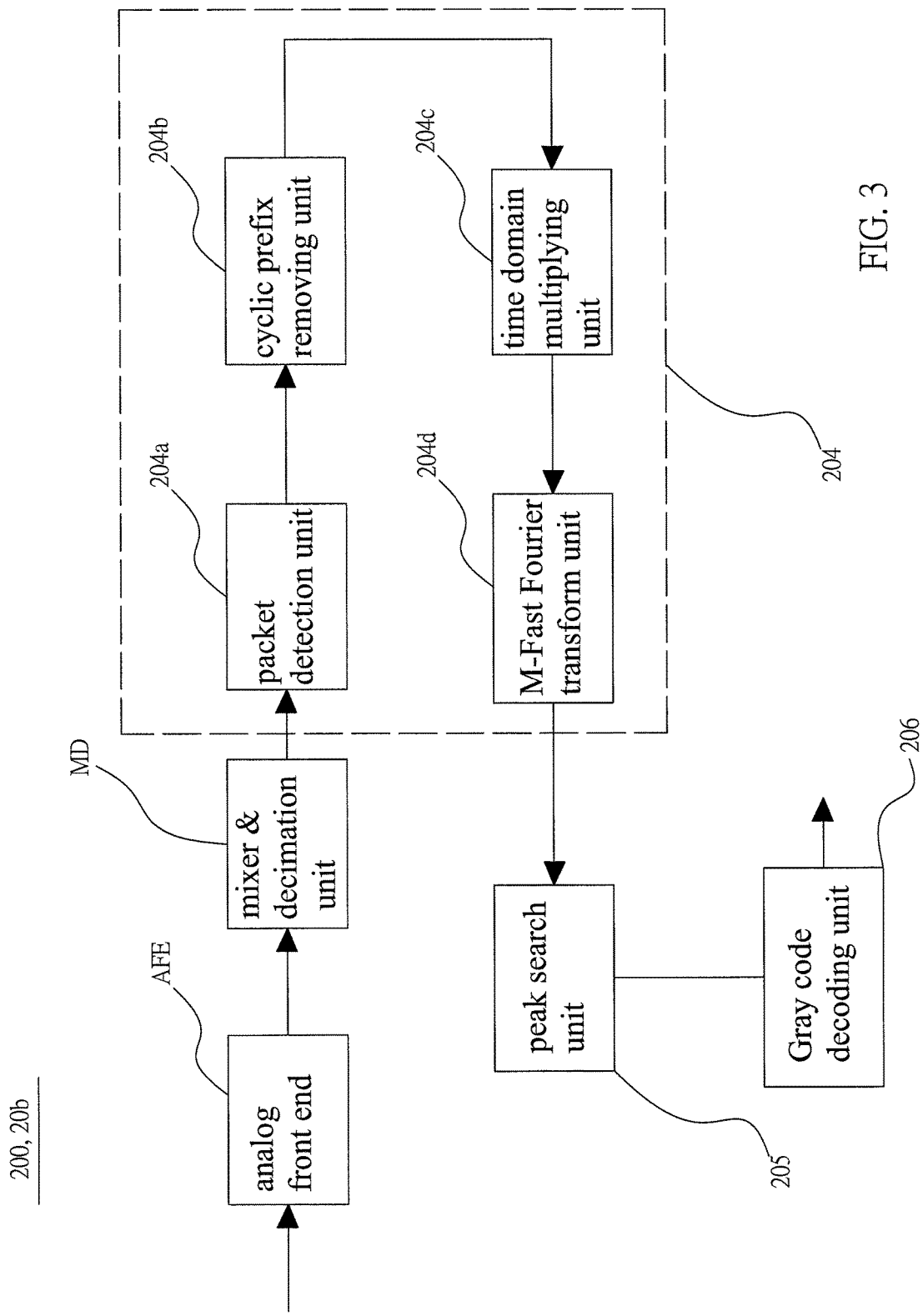

Please refer to FIG. 3. FIG. 3 is a schematic view showing a receiving end 20b of a device 200 according to the second embodiment of the invention. In this embodiment, an OFDM receiving unit 204 includes: a packet detection unit 204a monitoring the time domain signal to detect the presence of the time domain packet; a cyclic prefix removing unit 204b removes a cyclic prefix added to the time domain packet to restore the M-point time domain symbol; a time domain multiplying unit 204c multiplies the M-point time domain symbol with conj($s_0$(n)); an M-point Fast Fourier transform unit 204d converting the M-point product result into the frequency domain; where $s_0$(n) denotes the time domain waveform when the frequency shift value m is 0; a peak search unit 205, which is coupled to the M-point Fast Fourier transform unit 204d and determines the cyclic-frequency shift value corresponding to the peak of the M-point Fast Fourier transform output and a Gray code decoding unit 206 decodes the cyclic-frequency shift value into the K-bit message.

As previously mentioned, after the analog front end (AFE), a mixer & decimation unit (MD) properly moves the frequency and reduces the sampling rate (Mixer & Decimation) to move the middle frequency of the signal to zero on the frequency domain (hereinafter referred to as DC). After the process of the packet detection unit 204a and the cyclic prefix removing unit 204b, each CFS-OFDM symbol is composed of M points on the time domain.

Theoretically, circular convolution of two signals on the frequency domain is equivalent to the multiplication of those on the time domain. So, if the M-point signal on the time domain is multiplied with conj($s_0$(n)), and then the M-point FFT transforms the multiplied result into the frequency domain, the result is equal to the circular convolution result of the first embodiment. Thereafter, the peak search and the Gray decoder restore the original message. The circuit complexity of the M-point signal circular convolution requires $M^2$ multiplications, and the time domain multiplication only requires M multiplications. So, the complexity of the second method is lower than that of the first embodiment, but the second embodiment requires the additional filter for frequency shifting and sampling rate reduction. Usually, the center frequency of the original baseband signal in the wireless RF communication system is at DC, so the second method is suitable. However, in some wired communication systems, such as the power line transmission system, the center frequency of the original signal is not at DC, and the second method is not necessarily applicable.

In addition, when the transmission end adds pilots to some subcarriers for the purpose of estimating the sample rate offset and frequency offset, the multiplication on the time domain is unequal to the circular convolution on the frequency domain. In this case, the second embodiment is also not applicable.

Figure 4:
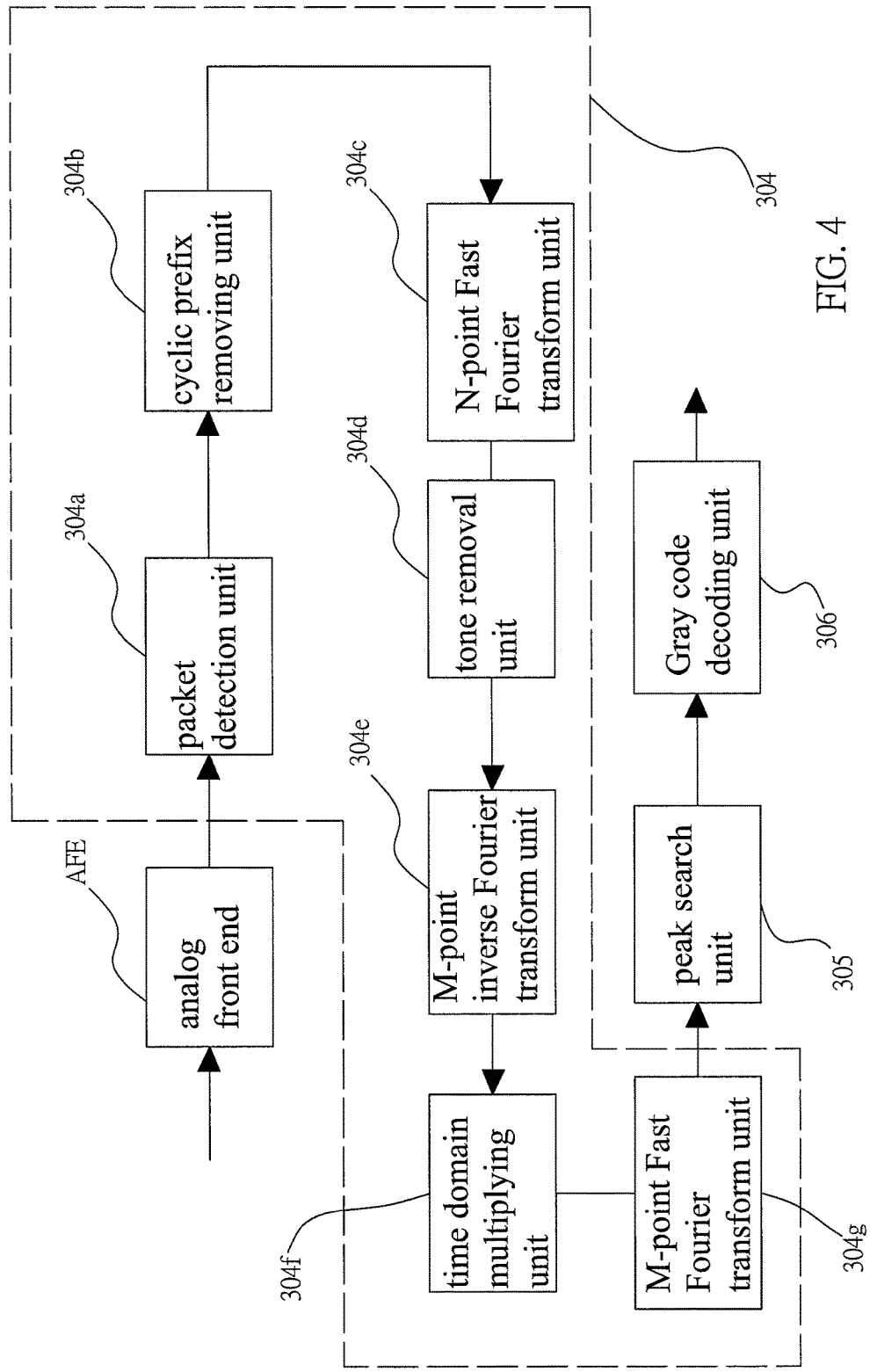

Please refer to FIG. 4. FIG. 4 is a schematic view showing a receiving end 30b of a device 300 according to the third embodiment of the invention. In this embodiment, an OFDM receiving unit 304 includes: a packet detection unit 304a monitoring the time domain signal to detect the presence of the time domain packet; a cyclic prefix removing unit 304b removing a cyclic prefix added to the time domain packet to restore the N-point time domain symbol; an N-point Fast Fourier transform unit 304c converts the N-point time domain symbol into the frequency domain symbol; a tone removal unit 304d removing the pilot and unused subcarriers from the frequency domain symbol to form an M-point frequency domain symbol; an M-point inverse Fourier transform unit 304e transforming the M-point frequency domain symbol into an M-point time domain symbol; a time domain multiplying unit 304f multiplying the M-point time domain symbol with conj($s_0$(n)); and an M-point Fast Fourier transform unit 304g converting the M-point product result into the frequency domain; where $s_0$(n) denotes the time domain symbol when the frequency shift value m is 0.

In addition, a peak search unit 305 is coupled to the M-point Fast Fourier transform unit 304g and determines the cyclic-frequency shift value corresponding to the peak on the frequency domain; and a Gray code decoding unit 306 decodes the K-bit message.

As previously mentioned, this embodiment considers that some CFS-OFDM communication systems add pilots to facilitate the estimation of the sample rate offset and frequency offset, or only M subcarriers are used to generate the CFS-OFDM signal under the regulatory restriction. In order to further reduce the complexity of the first embodiment, a third embodiment may be adopted. Similar to the first embodiment, after the N-point FFT is performed, the tone removal unit 304d removes the pilot and unused subcarriers with only M subcarriers left. The M-point IFFT transforms the signal into the time domain, the transformed signal is multiplied with conj($s_0(n)$), then the M-point FFT transforms the multiplied result into the frequency domain, and then the peak search unit 305 and the Gray code decoding unit 306 restores the transformed result to the K-bit message.

The complexity of the first embodiment needs $M^2$ multiplications, and the complexity of the third embodiment needs $M(2 \log_2(M)+1)$ multiplications, where $2M \log_2(M)$ comes from the M-point IFFT and FFT, and the additional M multiplications are the multiplications on the time domain. Usually, $2 \log_2(M)+1<M$, so the complexity is lower than that of the first embodiment.

The device and method of the invention have the following characteristics.

1. The CFS-OFDM spread spectrum technology can perform the transmission in the condition where the signal-to-noise ratio is very low, and is very suitable for the long-distance communications application.

2. The CFS-OFDM spread spectrum technology has better performance in the multipath channel compared to DSSS, FHSS and CSS because the cyclic prefix of the OFDM signal can be added.

3. The CFS-OFDM spread spectrum technology can utilize the frame preamble for synchronization to avoid the problem of difficult synchronization in FHSS.

4. The CFS-OFDM spread spectrum technology can transmit $\log_2(N)$ bits for each CFS-OFDM, thus has the transmission rate $\log_2(N)$ times that of CSS under the same spreading factor.

5. The CFS-OFDM spread spectrum technology has the extremely low peak to average power ratio on the time domain signal by properly selecting the frequency domain signal. Thus, linearity requirement of the RF gain amplifier of the transmitter is very low, and the cost of the amplifier can be significantly reduced.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A cyclic-Frequency shift orthogonal frequency division multiplex spread spectrum device, comprising:
at least one communication circuitry for performing a conversion between a series of bits and a frequency domain symbol out of a plurality of frequency combination patterns;
wherein different frequency combination patterns correspond to different bit values; and the device forms a cyclic frequency shift value utilizing a frequency reordering, each of the cyclic frequency shift values corresponding to a frequency combination pattern; the time domain symbol satisfies:

$$s_m(n) = \sum_{k=0}^{N-1} S(\text{mod}(k+m, N))e^{j2\pi kn/N}, m = 0 \sim N-1$$

where N denotes the number of all the subcarriers of an OFDM transmission circuitry, S(k) denotes the frequency domain symbol, k denotes the $k^{th}$ subcarrier, s(n) denotes a time domain signal, n denotes a $n^{th}$ time point, m denotes the cyclic-frequency shift value in a unit of subcarriers, mod(.,N) denotes taking a remainder of N, and N may be a power of two; and
the frequency domain symbol has many choices, and a symbol with a good auto-correlation property and a low peak to average power ratio is typically selected to achieve the best performance as follows:

$$S(k) = \exp^{\pm j\pi \frac{k^2}{N}}, k = 0 \sim N-1.$$

2. The cyclic-frequency shift orthogonal frequency division multiplex spread spectrum device according to claim 1, wherein the communication circuitry comprises:
a transmitter, comprising:
a cyclic-frequency shift (CFS) circuitry, which receives and converts a series of bits into a frequency domain symbol composed of N subcarriers, wherein the frequency domain symbol is a function of a cyclic-frequency shift value; and
an orthogonal frequency division multiplex spread spectrum (OFDM) transmission circuitry, which receives and converts the frequency domain symbol into a time domain symbol.

3. The cyclic-frequency shift orthogonal frequency division multiplex spread spectrum device according to claim 1, wherein the OFDM transmission circuitry comprises:
an N-point inverse Fourier transform circuitry, transforms an N-point frequency domain symbol into an N-point time domain symbol;
a cyclic prefix (CP) circuitry copying partial of the symbol at a distal end of the N-point time domain symbol to a front end of the N-point time domain symbol to generate the time domain symbol; and
a windowing circuitry, which is coupled to the cyclic prefix circuitry and reduces the interference of the time domain symbol on adjacent bands;
wherein the CFS circuitry utilizes a Gray code encoding circuitry used to minimize a bit error rate when a symbol demodulation error occurs.

4. A cyclic-Frequency shift orthogonal frequency division multiplex spread spectrum device, comprising:
at least one communication circuitry for performing a conversion between a series of bits and a frequency domain symbol out of a plurality of frequency combination patterns;
wherein different frequency combination patterns correspond to different bit values; and
the device forms a cyclic frequency shift value utilizing a frequency reordering, each of the cyclic frequency shift values corresponding to a frequency combination pattern;
the communication circuitry comprises:
a receiving end, which comprises:
an OFDM receiving circuitry, which receives and converts a time domain symbol into the frequency domain symbol; wherein the receiving end further comprises:

a circular convolution circuitry performing circular convolution on conj(S(−k)) and the frequency domain symbol;
a peak search circuitry, which is coupled to the circular convolution circuitry and determines a cyclic-frequency shift value corresponding to the peak of circular convolution result; and
a Gray code decoding circuitry using the cyclic-frequency shift value to decode a K-bit message.

5. The cyclic-frequency shift orthogonal frequency division multiplex spread spectrum device according to claim 4, wherein the OFDM receiving circuitry comprises:
a packet detection circuitry detecting the presence of the time domain packet;
a cyclic prefix removing circuitry removing a cyclic prefix added to the time domain packet to restore a N-point time domain symbol; and
an N-point Fast Fourier transform circuitry transforming the N-point time domain symbol into the frequency domain symbol.

6. The cyclic-frequency shift orthogonal frequency division multiplex spread spectrum device according to claim 4, wherein the OFDM receiving circuitry comprises:
a packet detection circuitry detecting the presence of the time domain packet;
a cyclic prefix removing circuitry removing a cyclic prefix added to the time domain packet to restore a M-point time domain symbol;
a time domain multiplying circuitry, which multiplies the M-point time domain symbol with conj($s_0(n)$); and
an M-point Fast Fourier transform circuitry converting the M-point time domain symbol into the frequency domain;
where $s_0(n)$ denotes the time domain symbol when the frequency shift value in is 0.

7. The cyclic-frequency shift orthogonal frequency division multiplex spread spectrum device according to claim 6, wherein the receiving end further comprises:
a peak search circuitry, which is coupled to the M-point Fast Fourier transform circuitry and determines the cyclic-frequency shift value corresponding to the peak on the frequency domain; and
a Gray code decoding circuitry using the cyclic-frequency shift value to decode the K-bit message.

8. A cyclic-Frequency shift orthogonal frequency division multiplex spread spectrum device, comprising:
at least one communication circuitry for performing a conversion between a series of bits and a frequency domain symbol out of a plurality of frequency combination patterns;
wherein different frequency combination patterns correspond to different bit values; and
the device forms a cyclic frequency shift value utilizing a frequency reordering, each of the cyclic frequency shift values corresponding to a frequency combination pattern;
the communication circuitry comprises:
a receiving end, which comprises:
an OFDM receiving circuitry, which receives and converts a time domain symbol into the frequency domain symbol; wherein the receiving end further comprises:
a circular convolution circuitry performing circular convolution on conj(S(−k)) and the frequency domain symbol;
a peak search circuitry, which is coupled to the circular convolution circuitry and determines a cyclic-frequency shift value corresponding to the peak of circular convolution result; and
a Gray code decoding circuitry using the cyclic-frequency shift value to decode a K-bit message; wherein the OFDM receiving circuitry comprises:
a packet detection circuitry detecting the presence of the time domain packet;
a cyclic prefix removing circuitry removing a cyclic prefix added to the time domain packet to restore a N-point time domain symbol;
an N-point Fast Fourier transform circuitry restoring the N-point time domain symbol into the frequency domain symbol;
a tone removal circuitry removing the pilot and unused subcarriers from the frequency domain symbol to form an M-point frequency domain symbol;
an M-point inverse Fourier transform circuitry transforming the M-point frequency domain symbol into an M-point time domain symbol;
a time domain multiplying circuitry multiplying the M-point time domain symbol with conj($s_0(n)$); and
an M-point Fast Fourier transform circuitry converting an M-point product result into a frequency domain;
where $s_0(n)$ denotes the time domain symbol when the frequency shift value m is 0.

9. The cyclic-frequency shift orthogonal frequency division multiplex spread spectrum device according to claim 8, wherein the receiving end further comprises:
a peak search circuitry, which is coupled to the M-point Fast Fourier transform circuitry and determines a cyclic-frequency shift value corresponding to the peak on the frequency domain; and
a Gray code decoding circuitry decoding the cyclic-frequency shift value into a K-bit message.

10. A cyclic-Frequency shift orthogonal frequency division multiplex spread spectrum device, comprising:
a transmitter, comprising:
a cyclic-frequency shift (CFS) circuitry for converting a series of bits into a frequency domain symbol composed of N subcarriers, wherein the frequency domain symbol is a function of a cyclic-frequency shift value; and
an orthogonal frequency division multiplex spread spectrum (OFDM) transmission circuitry, coupled to the CFS circuitry, for converting the frequency domain symbol into a time domain symbol, comprising:
an N-point inverse Fourier transform circuitry for transforming an N-point frequency domain symbol into an N-point time domain symbol;
a cyclic prefix (CP) circuitry, coupled to the N-point inverse Fourier transform circuitry, for copying partial of the symbol at a distal end of the N-point time domain symbol to a front end of the N-point time domain symbol to generate the time domain symbol; and
a windowing circuitry, coupled to the CP circuitry, for reducing the interference of the time domain symbol on adjacent bands,
wherein different frequency combination patterns correspond to different bit values; and the device forms a cyclic frequency shift value utilizing a frequency reordering, each of the cyclic frequency shift values corresponding to a frequency combination pattern; the time domain symbol satisfies:

$$s_m(n) = \sum_{k=0}^{N-1} S(\mathrm{mod}(k+m, N))e^{j2\pi kn/N}, m = 0 \sim N-1$$

where N denotes the number of all the subcarriers of the OFDM transmission circuitry, S(k) denotes the frequency domain symbol, k denotes the $k^{th}$ subcarrier, s(n) denotes a time domain signal, n denotes a $n^{th}$ time point, m denotes the cyclic-frequency shift value in a unit of subcarriers, mod(.,N) denotes taking a remainder of N, and N may be a power of two; and the frequency domain symbol has many choices, and a symbol with a good auto-correlation property and a low peak to average power ratio is typically selected to achieve the best performance as follows:

$$S(k) = \exp^{\pm j\pi \frac{k^2}{N}}, k = 0 \sim N-1.$$

11. The cyclic-frequency shift orthogonal frequency division multiplex spread spectrum device according to claim 10, wherein the CFS circuitry utilizes a Gray code encoding circuitry used to minimize a bit error rate when a symbol demodulation error occurs.

\* \* \* \* \*